United States Patent [19]

Brown et al.

[11] Patent Number: 4,506,569

[45] Date of Patent: Mar. 26, 1985

[54] MULTIPLE AXIS SLANT BED MACHINE

[75] Inventors: Ivan R. Brown, Breesport; Paul M. Bjorck, Elmira Heights; Brian M. Eaton, Elmira, all of N.Y.

[73] Assignee: Hardinge Brothers, Inc., Elmira, N.Y.

[21] Appl. No.: 438,495

[22] Filed: Nov. 2, 1982

[51] Int. Cl.³ .............. B23B 3/00; B23B 7/00; B23B 17/00; F16C 17/00
[52] U.S. Cl. .......................... 82/2 R; 82/32; 308/3 A
[58] Field of Search .............. 82/2 R, 32, 34 R, 36 A; 308/3 A; 409/134, 235

[56] References Cited

U.S. PATENT DOCUMENTS

| | | | |
|---|---|---|---|
| 848,578 | 3/1907 | Thelin | 409/337 |
| 1,338,742 | 5/1920 | Lofton | 29/36 |
| 1,575,735 | 3/1926 | Burrell et al. | 308/3 A |
| 1,763,519 | 6/1930 | Heinemann | 82/32 |
| 2,285,069 | 6/1942 | Vickers | 82/31 |
| 3,090,284 | 5/1963 | Dunning | 409/134 |
| 3,124,985 | 3/1964 | Curtis et al. | 82/2 R |
| 3,288,003 | 11/1966 | Luebkemann | 82/2 R |
| 3,481,230 | 12/1969 | Horobin | 82/2 R |
| 3,813,745 | 6/1974 | Kuck et al. | 29/36 |
| 3,943,802 | 3/1976 | Luebkemann | 82/2 R |
| 4,180,894 | 1/1980 | Link | 29/36 |
| 4,195,538 | 4/1980 | Brown | 82/27 |
| 4,226,400 | 10/1980 | VanDerwal | 308/3 A |

Primary Examiner—Francis S. Husar
Assistant Examiner—William E. Terrell
Attorney, Agent, or Firm—Shlesinger Arkwright Garvey & Fado

[57] ABSTRACT

A two slide multiple axis machine comprising a machine tool bed having at least two parallel, spaced apart, longitudinal ways; a spindle mount fixedly attached to the bed; a rotateable spindle mounted in the spindle mount at a distance from the bed and having an axis of rotation parallel to the axis of the ways and adapted for receiving and detachably holding a work piece; first tool means engageable with said work piece and displaceably mounted for forward and rearward motion in the first of said ways parallel to the longitudinal axis of said ways; second tool means engageable with said work piece and displaceably mounted for forward and rearward motion in the second of said ways; first way cover means covering the first of said ways and fixedly attached to said first tool means and adapted for movement with said first tool means; and, second way cover means fixedly attached to said second tool means and adapted for movement with said second tool means is disclosed.

17 Claims, 14 Drawing Figures

MULTIPLE AXIS SLANT BED MACHINE

BACKGROUND OF THE INVENTION

The disclosed invention relates to a multiple axis slant bed bar and chucker machine having the capability of performing operations throughout as many as four axes. Frequently, during the machining, boring and reaming of work there is a need to perform some of these functions, either separately or in combination. A machine tool having the capability to perform the required work in only one axis and only of one type of work has limited utility. Consequently, there exists a need for a machine which is capable of performing several types of work in at least two axes.

During the machining of work, chips and other forms of material shavings or cuttings must be removed from the work. To allow these chips to fall into the tracks or ways of a moveable tool means would, potentially, cause these ways to become jammed and prevent the operation of the machine tool. Consequently, there is a need for a machine in which the chips will not block the ways of the machine.

OBJECTS OF THE INVENTION

It is a primary object of the disclosed invention to provide a chucker and bar machine, or other similar machine, with the capability of utilizing at least two tool means each of which is displaceable and has at least two axes of motion.

It is an additional object of the disclosed invention to provide a machine tool in which each of the tool means is capable of performing several functions on a given piece of work.

It is a further object of the disclosed invention to mount the tool means in tracks or ways having a longitudinal axis parallel to the axis of rotation of the spindle.

Still another object of the disclosed invention is to provide a machine tool bed with a number of way cover means for covering the tracks or ways so to prevent the entrance of chips or other objects into the ways.

It is a further object of the disclosed invention to rotate the machine tool bed upwardly at an angle to the horizontal so that the chips or shavings will fall to the bed and then slide down the bed so to be easily removed.

Yet another object of the disclosed invention is to provide each of the tool means with an independently driven carriage system for longitudinally and transversely displacing the tool means.

Still another object of the disclosed invention is to provide a number of apertures in the spindle mount to allow the way cover means to pass through the apertures and to allow the tool means to come substantially close to the spindle mount.

A further object of the disclosed invention is to provide a control system for sequentially operating the various elements of the machine tool.

These and other objects and advantages of the invention will be readily apparent in view of the following description and drawings of the above-described invention.

DESCRIPTION OF THE DRAWINGS

Preferred embodiments of the invention are disclosed in the accompanying drawings in which.

DESCRIPTION OF THE INVENTION

A chucker and bar machine M is comprised, generally, of a base or frame B, a rotateable spindle S for holding a work piece (not shown) so that the necessary operations may be performed by a tool means or turret T on a work piece (not shown).

Figures 5, 6, 7:
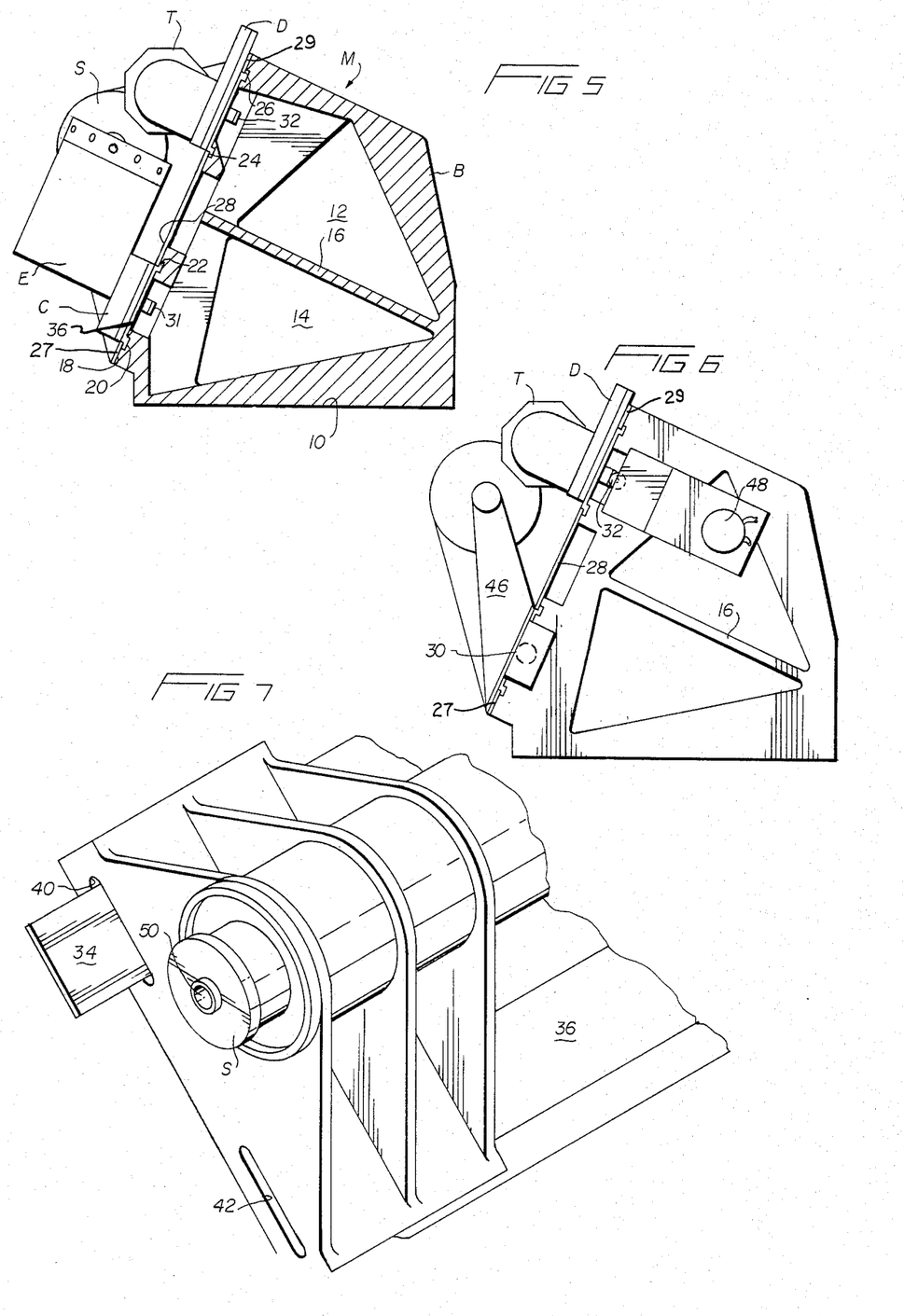
FIG. 5 is a cross-sectional view along the section 5—5 of FIG. 2 and viewed in the direction of the arrows.
FIG. 6 is right end elevational view of the machine showing the turret and tail stock displacing means.
FIG. 7 is a fragmentary perspective view of the spindle mount on the tool bed.

Referring now to FIG. 5, the base B has a horizontal surface 10 for attaching the chucker or bar machine M to a suitable stationary platform (not shown). The base B has torque chambers 12 and 14 separated by a division wall 16.

The base B has a surface 18 rotated at an angle upwards to the horizontal for mounting of necessary equipment. The surface 18 has a number of tracks or ways 20 and 22, and 24 and 26 for mounting a lower turret E and an upper turret T, respectively. The ways 20, 22, 24 and 26 extend longitudinally along the length of the rotated surface 18. Between the ways 22 and 24 is cover plate 28 extending longitudinally parallel to ways 22 and 24 and fixedly attached to the frame B above the division wall 16.

Similarly, cover plate 27 is fixedly attached to bed B adjacent way 20 and a fixed edge portion thereof extends over and adjacent way 20. Likewise, cover plate 29 is fixedly secured to bed B adjacent way 26 and cover plate 29 has a portion thereof extending over and adjacent way 26. It will be noted in FIGS. 5 and 6, that cover plate 28 likewise includes side edge portions which extend over and adjacent ways 22 and 24.

Equidistant between the ways 20 and 22 is ball screw and nut 31, when the turret E is used, as best shown in FIG. 5, or piston 30 when the tail stock 46 is used, as best shown in FIG. 6. Ball screw and nut 31 extends the length of the ways 20 and 22 and parallel to those ways. Piston 30 has a rod extending parallel to ways 20 and 22 and is of sufficient length to position tail stock 46 substantially close to spindle S. A second ball screw and nut 32 centrally located between the ways 24 and 26 extends longitudinally the length of the bed B between ways 24 and 26 and parallel to those ways for displacing turret T.

Way cover means 34 are mounted in the ways 24 and 26 and cover the opening between the ways 24 and 26. Way cover 34 includes longitudinal side edge portions which are received within ways 24 and 26. The top cover plates 29 and 28 each include fixed way edge portion covers which extend over and adjacent to the way cover 32. The edge portion covers retain the displacable way cover 34 therebetween and thereby prevent chips from falling into the way means and under the way cover means 34. Way cover means 34 is attached to the upper turret or tool means T. Likewise, way cover means 36 is located between ways 20 and 22 for covering the opening between the ways 20 and 22 and is fixedly secured to the lower turret or tool means E or tail stock 46 and is displaceably mounted in ways 20 and 22.

Way cover 36 includes longitudinal side edge portions which are received within ways 20 and 22. Top cover plates 27 and 28 include fixed way edge portion covers which extend over and adjacent to the way cover 36 longitudinal side edge portions. The edge portion covers retain the displacable way cover 36 therebetween and thereby prevent chips from falling into the way means and under the way cover means. Additionally, top plate 28 prevents chips from falling between the two spaced apart parallel longitudinal ways 22 and 24.

As best shown in FIG. 7, the spindle S is mounted in a mount 38. Mount 38 has at least two apertures 40 and 42 longitudinally traversing mount 38 and lining up with way cover means 34 and 36 and allowing way cover means 34 and 36 to pass through the apertures 40 and 42.

As best shown in FIG. 6, piston 30 is drivingly connected to displaceable tail stock 46 (cf. FIG. 1) which is mounted in ways 20 and 22. Piston 30 is capable of displacing tail stock 46 both towards spindle S and away from spindle S.

Although a tail stock 46 is shown in FIG. 6, a lower turret E, as best shown in FIG. 5, may be mounted between ways 20 and 22 and drivingly connected to ball screw and nut 31. Motor means (not shown) for causing ball screw and nut 31 to displace lower turret E has the capability of longitudinally moving lower turret E both toward or away from spindle S.

Likewise, a motor means 48 is drivingly connected to ball screw and nut 32 in order to cause the tool means T to travel towards or away from the spindle S. The tool means E and the tool means T may be mounted on carriages C and D, respectively, adapted to allow the tool means T and E to move transversely of the longitudinal axis of the rotating spindle S, as indicated by the directional arrows. In this way, tool means T or tool element E may contact the work piece (not shown) as needed.

Figure 1:
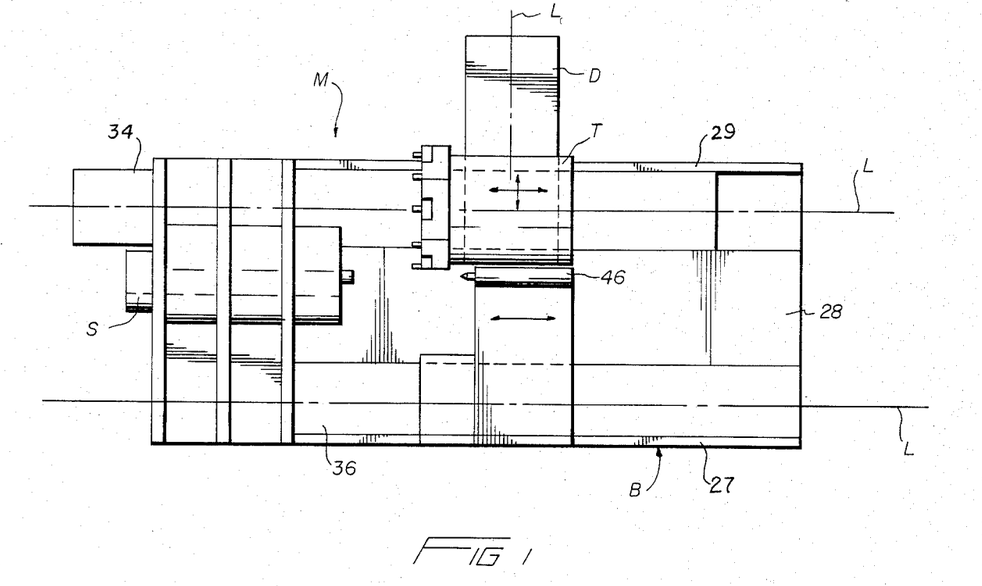
FIG. 1 is top plan view of a two axis machine with a tail stock, further shown in phantom lines and showing way axes and coverage extension lines and translation arrows for the top turret and the tail stock.

As best shown in FIG. 1, the tool means T when mounted on the carriage D, which includes a cross-carriage, is capable of moving toward and away from the spindle S and also transversely to the longitudinal axis of rotation of the spindle S, as shown by axis lines L. The tail stock 46 is not transversely displaceable of the ways 20 and 22. Consequently, two axes for cutting, etc., are provided when the tail stock 46 is used. That is, longitudinally towards and away from the spindle S and transversely towards and away from the longitudinal axis of rotation of the spindle S.

Figure 2:
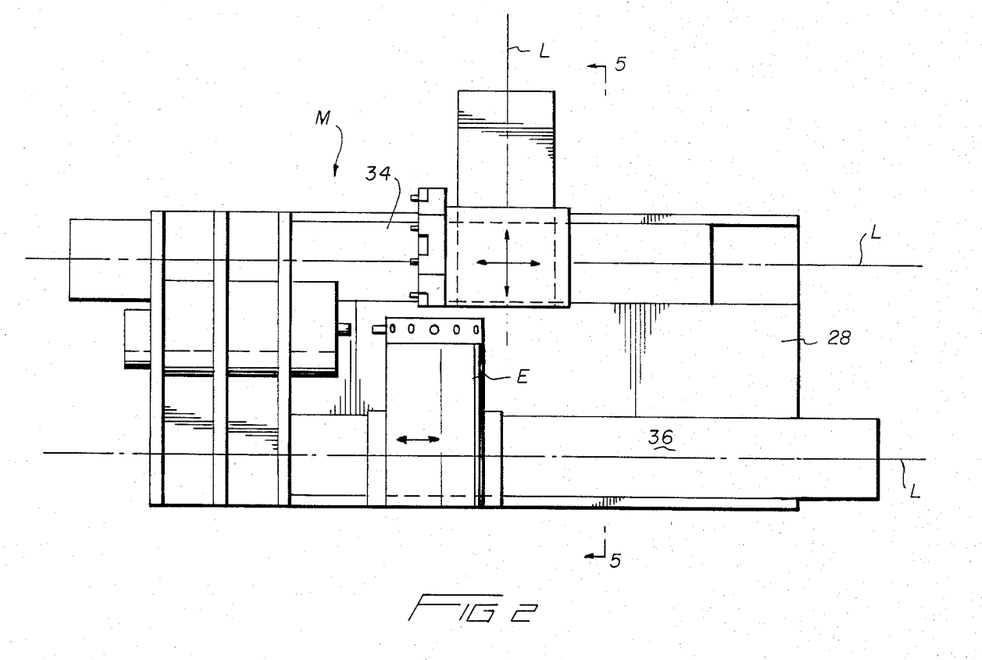
FIG. 2 is a top plan view of a three axis machine with a turret displaceably along the third axis.

If the tail stock 46 is replaced with a lower turret E, having no cross-carriage, as best shown in FIG. 2, then the lower tool means E is displaceable only toward and away from the spindle S, and a three axis machine has been created. This requires that the upper turret T be mounted on the carriage D, which includes a cross-carriage, and be displaceable transversely of the longitudinal axis of rotation.

Figures 3, 4, 4A:
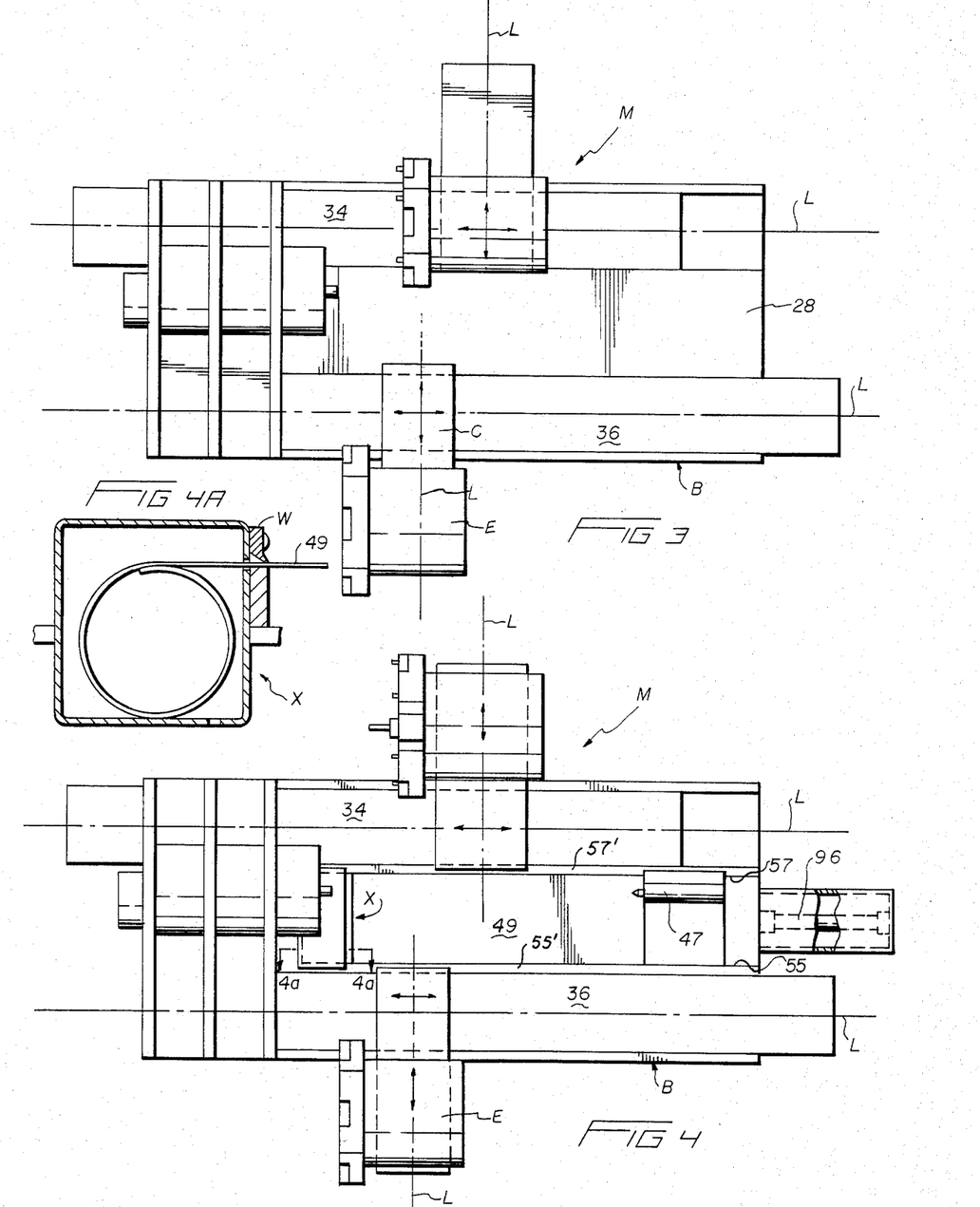
FIG. 3 is a perspective view of a four axis machine with the turret displaceable along the third and fourth axes.
FIG. 4 is a perspective view of a different embodiment of the machine tool of FIG. 3 with the tool means at different positions and including a tail stock between the tool means.
FIG. 4A is a cross-sectional view along the section 4A—4A of FIG. 4 and disclosing the coil box for receiving the way cover means of the tail stock.

Should the lower tool element E be mounted on a carriage C, which includes a cross-carriage, for longitudinal motion both toward and away from the spindle S and transversely toward and away from the longitudinal axis of rotation of the spindle mount, then a four axis machine will be created, as best shown in FIG. 3. As best shown in any one of FIGS. 1 through 4, way cover means 34 and 36 are fixedly attached to their respective upper tool means T, lower turret E, or tail stock 46. Way cover means 34 and 36 may each be comprised of a set of way covers such that one piece of a set is attached to the spindle side of the upper tool means T while the other piece of the set is attached to the opposite side of the upper tool means T.

Likewise, way cover means 36 may have one side attached to the spindle side of the tail stock 46 or the lower tool means E while the other piece is attached to the opposite side of tail stock 46 or lower tool means E. In this way, the ways 20 and 22 and 24 and 26 are covered and no chips or shavings may fall into the ways and block the respective ball screw and nut 31 and 32 or piston 30.

The spindle S is driven by any appropriate means (not shown) and has an aperture 50 extending longitudinally through the spindle S and coincident with the longitudinal axis of rotation of the spindle S so that bar stock (not shown) may be inserted into the aperture 50 and through the spindle S so to be worked on by the upper tool means T or the lower tool means E or to be held by tail stock 46. The spindle S is adapted to hold or release the work piece (not shown) in a manner well known in the art.

While the bar stock (not shown) is being held in the aperture 50 of the spindle S and extends through the spindle S, it may be worked on by tool means T or tool means E and any chips or shavings will fall from the work piece (not shown) and slide along the cover plate 28 and/or across way cover means 36 and/or 34 and subsequently fall from the bed B, without jamming the machine.

In another embodiment of the machine M, a tail stock 47 may be displaceably positioned in ways 55 and 57, as best shown in FIG. 4. Ways 55 and 57 extend longitudinally parallel to ways 20 and 22 and ways 24 and 26. Way cover means 49 is displaceable in ways 55 and 57. Tail stock 47 is displaced in ways 55 and 57 by hydraulic cylinder 96 mounted below cover plate 28. Way cover means 49 is made of a thin sheet of spring steel and, as best shown in FIG. 4A, is capable of being coiled in coil box X when tail stock 47 moves toward spindle S. Way cover 49 includes longitudinal side edge portions which are received within ways 57 and 55. Top plate portions 55' and 57' are secured to bed B and each includes fixed way edge portion covers extending over and adjacent to the longitudinal side edge portions of way cover 49. Top plate portions 55' and 57' thereby retain the displacable way cover 49 therebetween in order to prevent chips from falling into the way means and under the way cover means. A wiper W is mounted to coil box X for wiping dirt, grease, or other contaminants from way cover means 49 prior to entering coil box X. Solid way cover means (not shown) extend on the other side of tail stock 47 and are similar to way cover means 34 and 36 and are adapted for moving in ways 55 and 57 with tail stock 47. In this embodiment, the tail stock 47 may hold the work piece (not shown) while it is being machined by tool means T and/or E.

Figure 8:
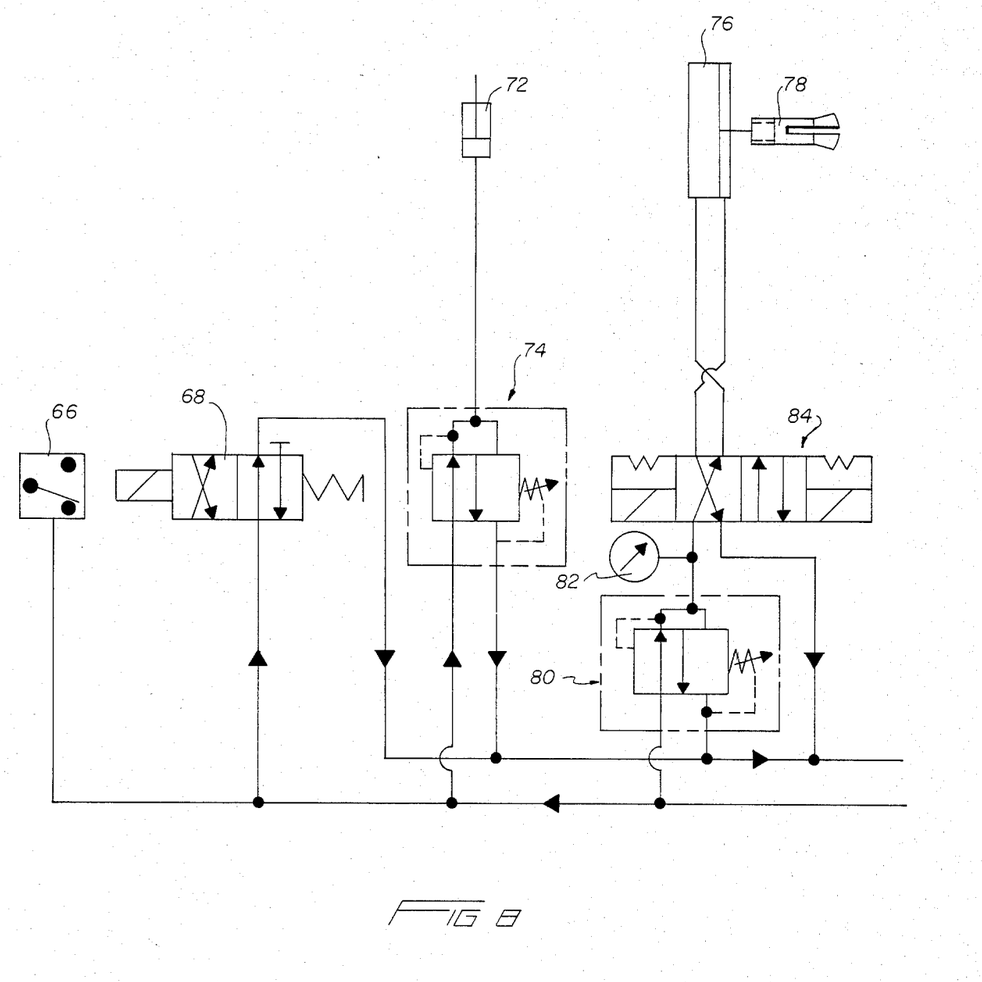
FIGS. 8, 9, 10 are sequential diagrams showing substantially the entire hydraulic control system of the machine portion shown in block diagram; and, FIGS. 11, 12 and 13 are sequential diagrams showing substantially the entire pneumatic control system of the machine portions shown in block diagram.
Figure 9:
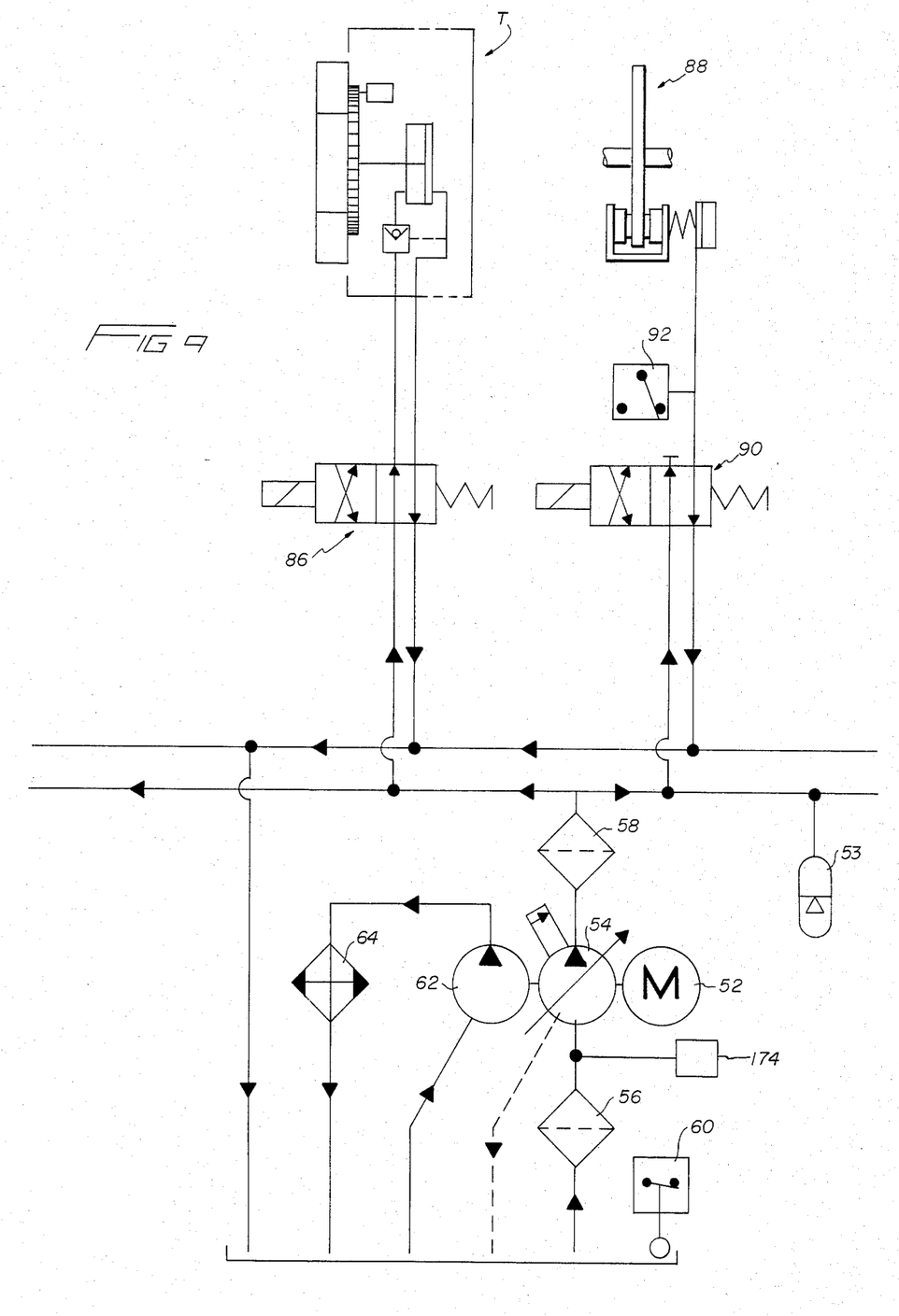
Figure 10:
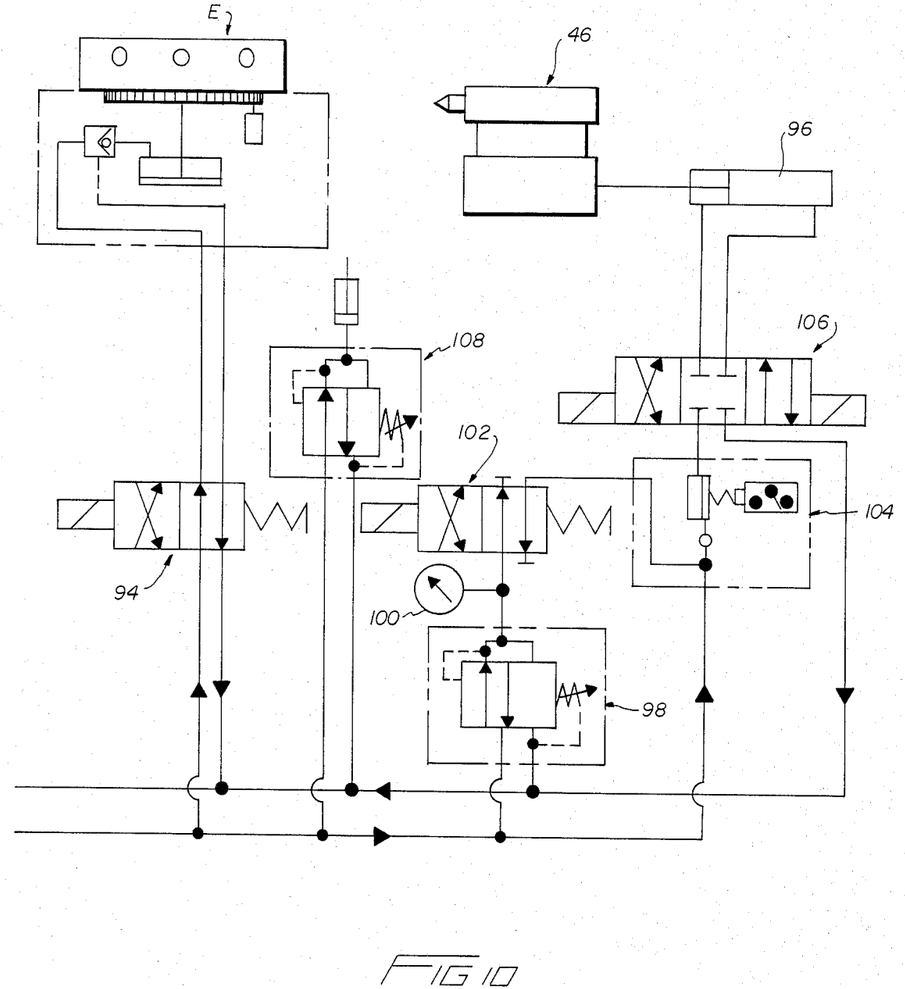

HYDRAULIC CONTROL SYSTEM FIGS. 8, 9, and 10

The chucker or bar machine, in addition to having electrical controls (not shown) for rotating the spindle S and displacing the tool means T or E, has both an hydraulic control system and a pneumatic control system, complete with appropriate electrical connections.

Referring now to FIG. 9, a motor 52 is connected to an hydraulic pump 54 and accumulator 53 which has a suction strainer 56 before the pump and a high pressure filter 58 after the pump. In this way, hydraulic fluid is pressurized so to enable the appropriate functions to be carried out. A level switch 60 is provided in order to prevent damage to the pump 54 caused by loss of fluid. A circulating pump 62 is connected to a heat exchanger 64 in order to maintain an appropriate temperature for the hydraulic fluid. The hydraulic fluid, after passing through the hydraulic pump 54 proceeds by a number of pipes or tubes (not shown) to the appropriate element.

Referring now to FIG. 8, a pressure switch 66 is provided in order to prevent damage to any of the components by over-pressure or under-pressure. An accumulator unloader 68 is provided on the pressurized side of the fluid system to control the hydraulic pressure and to cause any excess fluid to be diverted to a storage tank (not shown). Appropriate electrical connections are provided (not shown).

The tool means T is provided with a cross-slide counter balance 72 in order to maintain the positioning of the tool means T. A pressure reducing valve 74 is connected to the cross-slide counter balance 72 in order to provide cross-slide counter balance 72 with the appropriate working pressure. Appropriate electrical connections (not shown) are provided.

A collet closer 76 is connected to the spindle S to open and close the collet 78 mounted in the aperture 50 of the spindle S and so to hold or release a work piece (not shown). A pressure reducing valve 80 and a collet closer gauge 82 are connected to four-way valve 84, having the appropriate electrical connections (not shown), for operating the collet closer 76.

When the chucker and bar machine M is adapted for two axes of work, as previously described, then a four-way valve 86, having appropriate electrical connections (not shown) is adapted for causing the turret to lock and unlock by raising and lowering the multiple tool carrying plate.

Spindle brake 88 is operated through a four-way valve 90, having the appropriate electrical connections (not shown), and pressure switch 92, having the appropriate electrical connections (not shown).

Should the machine M be adapted for three axes work, as previously described, then a four-way valve 94, (FIG. 10) having appropriate electrical connections (not shown) is provided for causing the turret to lock and unlock by raising and lowering the multiple tool carrying plate.

On the other hand, should the tail stock 46 or 47 be used, then an hydraulic cylinder 30 or 96 is used to displace the tail stock 46 or 47, respectively. A pressure reducing valve 98 with a pressure gauge 100 is connected to a four-way valve 102 which is connected to a Hall Effect switch 104. The Hall Effect switch 104 is connected to a four-way valve 106, having the appropriate electrical connections (not shown), for causing the hydraulic cylinder 30 or 96 to be displaced and consequently, to position the tail stock 46 or 47, respectively.

Should the four axes configuration be chosen, then an additonal cross-slide counter balance 108 is provided to maintain the position of the tool element E.

Computer means 174 is connected to the hydraulic system through the appropriate connections for operating the system. Although a computing means 174 is shown, any form of electrical logic system should be capable of performing this function.

Figure 11:
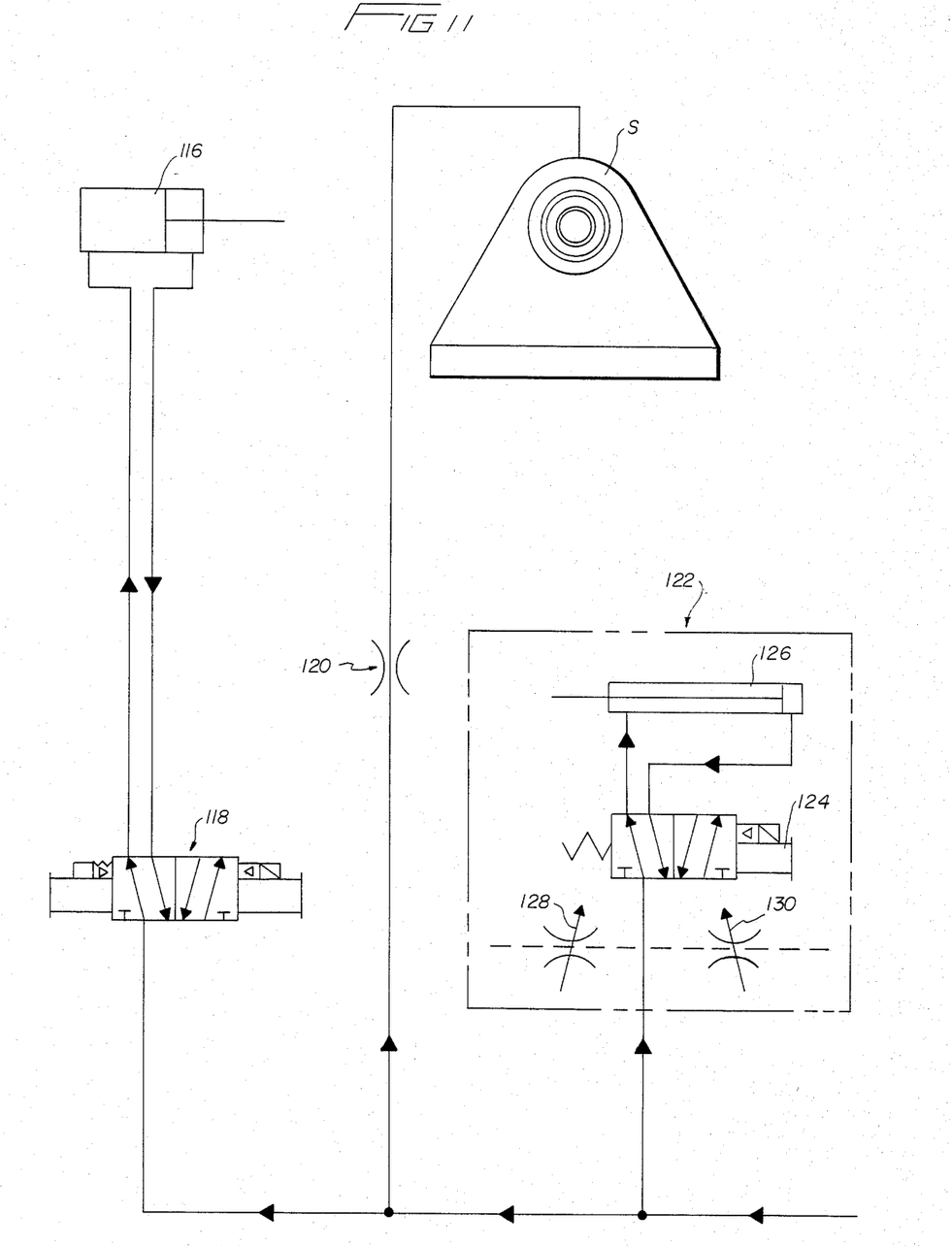
Figure 12:
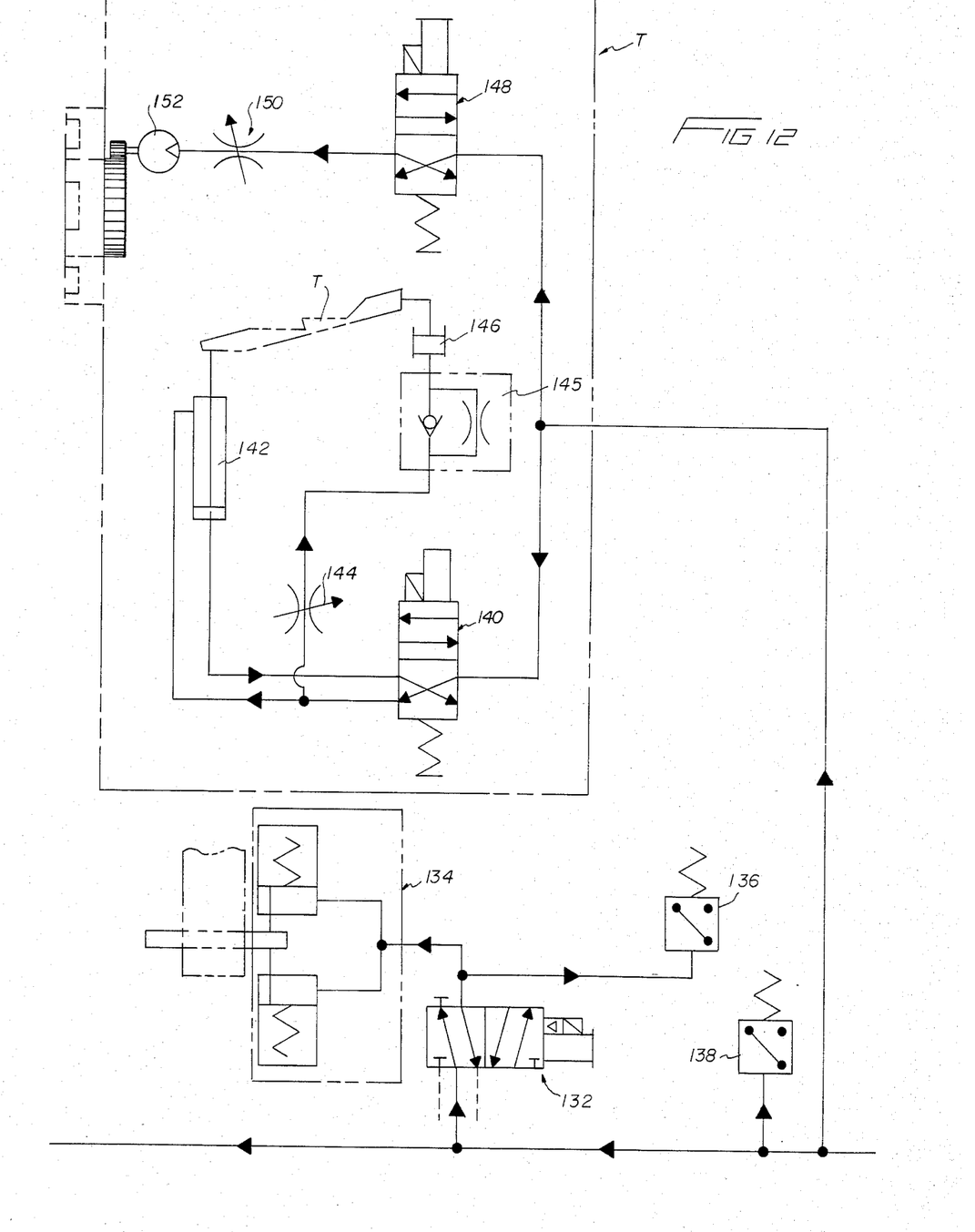
Figure 13:
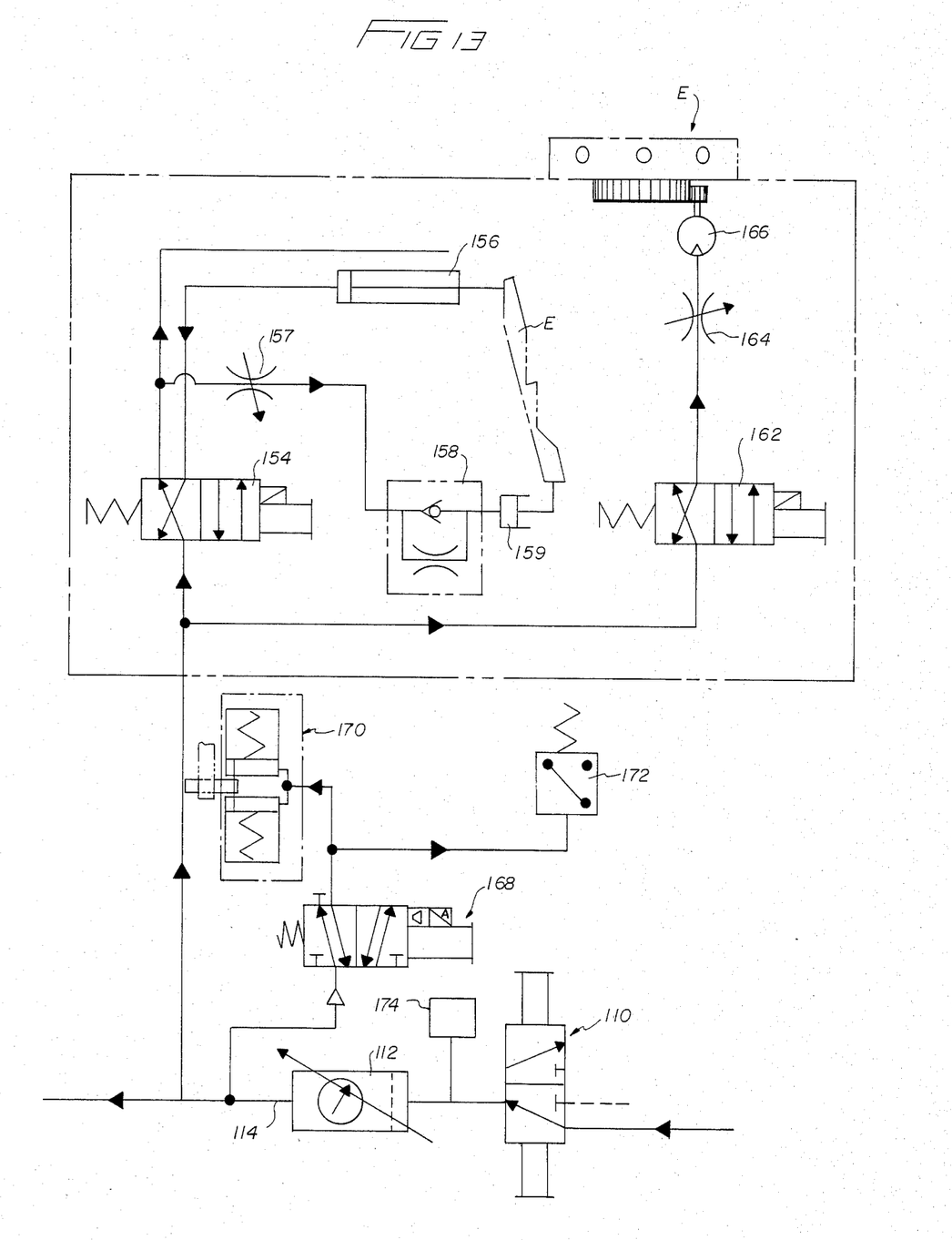

PNEUMATIC CONTROL SYSTEM FIGS. 11, 12 and 13

The pneumatic control system is best shown in FIGS. 11, 12 and 13. Pressurized air may be provided by any appropriate means and is input to a three-way lock-out valve 110 which is followed by filter, regulator, lubricator 112. Appropriate connections are made in the air supply line 114.

A spindle lock pin 116 is controlled by four-way valve 118. Appropriate electrical connections (not shown) are provided for the four-way valve 118 and lock pin 116.

A jet 120 is connected to the spindle S and collet closer 76 for preventing coolant or other contaminants from getting into the bearing seals of the spindle S.

A parts chute 122 for catching finished parts (not shown) is operated by four-way valve 124 which is connected to pneumatic cylinder 126 for operating the parts chute 122. Flow control valves 128 and 130 are provided before the four-way valve 124. A four-way valve 132 is connected to the cross-slide brake 134 and to cross-slide brake pressure switch 136. The main air pressure switch 138 is shown. Appropriate electrical connections are provided (not shown).

Should the two axis configuration be desired, then the pressurized air feeds the four-way valve 140 which feeds pneumatic cylinder 142 and four-way valve 140 for feeding flow control valve 144 which is used to feed restricted check valve 145 for operating piston 146. Pistons 142 and 146 are used to stop and cushion turret rotation when indexing to the next tool station is completed. The appropriate electrical connections are provided (not shown).

Connected to the same supply line feeding the four way valve 140 is a four-way valve 148 which leads to a flow control valve 150 which drives air motor 152 for indexing the turret T. Appropriate electrical connections are provided (not shown).

Should the three-axis configuration be chosen, then the air supply feeds a four-way valve 154 which feeds pneumatic cylinder 156. After the four-way valve 154, but before the pneumatic cylinder 156, is flow control valve 157 which leads to restricted check valve 158 for piston 159 for stopping and cushioning turret rotation when indexing to the next tool station is completed. Appropriate electrical connections are provided (not shown).

A four-way valve 162 simultaneously feeds flow control valve 164 which is used to drive air motor 166 attached to tool element E, for indexing tool element E.

Appropriate electrical connections are provided (not shown).

Should the four-axis configuration be chosen, then a four-way valve 168 feeds a fourth axis cross-slide brake 170 and pressure switch 172. Appropriate electrical connections are provided (not shown).

Computing means 174 is connected to the pneumatic control system through the appropriate connections for operating the system. Although a computing means is disclosed, any suitable form of electrical logic system may be used.

While this invention has been described as having a preferred design, it is understood that it is capable of further modification, uses and/or adaptations of the invention following in general the principle of the invention including such departures from the present disclosure as come within known or customary practice in the art to which the invention pertains, and as may be applied to the central features hereinbefore set forth, and fall within the scope of the invention of the limits of the appended claims.

What I claim:

1. A multiple slide multiple axis machine, comprising:
   (a) a machine tool bed including a ground supported generally horizontal surface and a working surface having first and second longitudinal spaced edges;
   (b) at least two spaced apart parallel longitudinal way means disposed in said working surface, each of said way means including a pair of cooperating spaced parallel ways;
   (c) a spindle mount fixedly attached to said bed and substantially spanning said working surface between said edges;
   (d) said spindle mount including a forward substantially planar portion thereof generally transverse of and adjacent to said way means;
   (e) a rotatable spindle mounted in said spindled mount at a distance from said working surface and having an axis of rotation parallel to said way means, said spindle adapted for receiving and detachably holding a work piece;
   (f) at least two spaced apart apertures disposed through said spindle mount, each of said apertures longitudinally aligned with one of said way means;
   (g) first tool means engageable with the work piece, said first tool means displacably mounted for forward and rearward motion in a first of said way means parallel to the longitudinal axes of said way means;
   (h) first way cover means secured to said first tool means and displacable therewith and disposed between said two ways of said first way means for covering said first way means and adapted for passing through the aperture aligned with said first way means and thereby permitting said first tool means to be disposed closely adjacent said planar portion;
   (i) first means for displacing said first tool means;
   (j) second tool means engageable with the work piece, said second tool means displaceably mounted for forward and rearward motion in a second of said way means parallel to the longitudinal axes of said way means;
   (k) second way cover means secured to said second tool means and displacable therewith and disposed between said two ways of said second way means for covering said second way means and adapted for passing through the aperture aligned with said second way means and thereby permitting said second tool means to be disposed closely adjacent said planar portion;
   (l) second means for displacing said second tool means;
   (m) control means operatively associated with each of said first and second means and adapted for permitting independent displacement and thereby operation of said first and second tool means;
   (n) said displaceable way cover means each including longitudinal side portions received in said ways; and,
   (o) fixed way edge portion cover means extending over and adjacent to said way cover means longitudinal side portions for retaining said displacable way cover means therebetween and thereby preventing chips from falling into said way means and under said way cover means and between said at least two spaced apart parallel longitudinal way means.

2. A multiple slide multiple axis machine as defined in claim 1, wherein:
   a. said bed is slanted at an angle disposed upwardly to the horizontal.

3. A multiple slide multiple axis machine as defined in claim 2, wherein:
   (a) each of said first and second way cover means has a top surface parallel to a top surface of said fixed way edge portion cover means for causing chips to slide thereon and away therefrom.

4. A multiple slide multiple axis machine as defined in claim 1, wherein:
   (a) said first tool means is displaceably mounted for movement along an axis transverse to the longitudinal axes of said way means; and,
   (b) means are connected to said first tool means for displacing said first tool means along said transverse axis.

5. A multiple slide multiple axis machine as defined in claim 4, further comprising:
   a. said first tool means includes a first turret adapted for receiving a plurality of work tools.

6. A multiple slide multiple axis machine as defined in claim 1, wherein:
   a. said second tool means includes a tail stock, said tail stock having an axis corresponding with, aligning with and coincident with said spindle axis.

7. A multiple axis machine as defined in claim 6, further comprising:
   a. an hydraulic cylinder for displacing said tail stock in said way means.

8. A multiple slide multiple axis machine as defined in claim 1, wherein:
   (a) said second tool means is displaceably mounted for movement along an axis transverse to the longitudinal axes of said way means; and,
   (b) means are connected to said second tool means for displacing said second tool means along said transverse axis.

9. A multiple slide multiple axis machine as defined in claim 8, wherein:
   a. said second tool means includes a second turret adapted for receiving a plurality of work tools.

10. A multiple slide multiple axis machine as defined in claim 1, wherein:
    a. said second tool means includes a second turret adapted for receiving a plurality of work tools.

11. A multiple slide multiple axis machine as defined in claim 1, further comprising:
 a. a first ball screw and nut mounted beneath said first way means;
 b. a second ball screw and nut mounted beneath said second way means;
 c. said first ball screw and nut drivingly connected to said first tool means and adapted for moving said first tool means in said first way means; and,
 d. said second ball screw and nut drivingly connected to said second tool means and adapted for moving said second tool means in said second way means.

12. A multiple slide multiple axis machine as defined in claim 1, wherein:
 (a) a first carriage is displaceably mounted for forward and rearward movement in said first way means along said way means longitudinal axis;
 (b) said first tool means is displaceably mounted on said first carriage and said first carriage is adapted for movement of said first tool means transversely to said first way means longitudinal axis;
 (c) said first way cover means covers said first way means and is fixedly attached to said first carriage and adapted for movement with said first carriage.

13. A multiple slide multiple axis machine as defined in claim 12, wherein:
 (a) a second carriage is displaceably mounted for forward and rearward movement in said second way means along said way means longitudinal axis;
 (b) said second tool means is displaceably mounted on said second carriage and said second carriage is adapted for movement of said second tool means transversely to said second way means longitudinal axis; and,
 (c) said second way cover means covers said second way means and is fixedly attached to said second carriage and adapted for movement with said second carriage.

14. A multiple slide multiple axis machine as defined in claim 1, wherein:
 a. said first way cover means includes a two piece way cover set; and,
 b. a first piece of said set is fixedly attached to said first tool means spindle side and the second piece of said set is fixedly attached to the opposite side of said first tool means.

15. A multiple slide multiple axis machine as defined in claim 1, wherein:
 a. said second way cover means includes a two piece way cover set; and,
 b. a first piece of said second set is fixedly attached to said second tool means spindle side and the second piece of said set is fixedly attached to the opposite side of said second tool means.

16. A multiple slide multiple axis machine as defined in claim 1, wherein:
 (a) at least three spaced apart parallel longitudinal way means are disposed in said working surface;
 (b) third tool means are engagable with the work piece and displacably mounted for forward and rearward movement in a third of said way means parallel to the longitudinal axes of said way means;
 (c) third way cover means covers the third of said way means and is fixedly attached to said third tool means and adapted for movement with said third tool means; and,
 (d) a third means for displacing said third tool means is connected to said bed.

17. A multiple slide multiple axis machine as defined in claim 16, wherein:
 (a) said third tool means engageable with the work piece is mounted between and supported by said first and second way means;
 (b) said third tool means is displaceably mounted for forward and rearward motion; and,
 (c) means are connected to said third tool means for displacing said third tool means.

* * * * *